(12) United States Patent
Kokon

(10) Patent No.: US 9,139,196 B2
(45) Date of Patent: Sep. 22, 2015

(54) REGENERATIVE CONTROL DEVICE, HYBRID VEHICLE, REGENERATIVE CONTROL METHOD, AND COMPUTER PROGRAM

(75) Inventor: Junya Kokon, Tokyo (JP)

(73) Assignee: HINO MOTORS, LTD., Tokyo (JP)

( * ) Notice: Subject to any disclaimer, the term of this patent is extended or adjusted under 35 U.S.C. 154(b) by 0 days.

(21) Appl. No.: 13/819,013

(22) PCT Filed: Oct. 20, 2011

(86) PCT No.: PCT/JP2011/074192
§ 371 (c)(1),
(2), (4) Date: Feb. 26, 2013

(87) PCT Pub. No.: WO2012/077416
PCT Pub. Date: Jun. 14, 2012

(65) Prior Publication Data
US 2013/0173107 A1    Jul. 4, 2013

(30) Foreign Application Priority Data

Dec. 6, 2010 (JP) ................................. 2010-271864

(51) Int. Cl.
*B60W 10/18* (2012.01)
*B60W 20/00* (2006.01)
(Continued)

(52) U.S. Cl.
CPC .............. *B60W 20/1062* (2013.01); *B60K 6/48* (2013.01); *B60L 7/18* (2013.01); *B60L 7/26* (2013.01);
(Continued)

(58) Field of Classification Search
CPC ................... B60W 20/1062; B60W 30/18127; B60W 30/18136; B60L 2260/30

USPC ........................................ 701/22; 180/65.265
See application file for complete search history.

(56) References Cited

U.S. PATENT DOCUMENTS

| 2003/0042054 A1 | 3/2003 | Matsubara et al. |
| 2004/0251691 A1 | 12/2004 | King et al. |

(Continued)

FOREIGN PATENT DOCUMENTS

| CN | 101061011 A | 10/2007 |
| CN | 101234636 A | 8/2008 |

(Continued)

OTHER PUBLICATIONS

International Search Report of the corresponding International Application, PCT/JP2011/074192 dated Nov. 22, 2011.

(Continued)

*Primary Examiner* — Thomas G Black
*Assistant Examiner* — Peter D Nolan
(74) *Attorney, Agent, or Firm* — Cowan, Liebowitz & Latman, P.C.

(57) ABSTRACT

In a hybrid vehicle, threshold values A<B≤C are provided to a value indicating a state of charge of the battery (SOC). When SOC<A or SOC≤A, the vehicle uses the regeneration torque of the electric motor as the braking force. When SOC≥A or SOC>A, the vehicle uses both of engine braking of the engine and the regeneration torque of the electric motor as the braking force. When SOC≥B or SOC>B in the operating form solely with the electric motor, the vehicle uses both of engine braking of the engine and the regeneration torque of the electric motor as the braking force. When SOC≥C or SOC>C in the operating form with cooperation of the engine and the electric motor, limitation of electric power by the regenerative power generation is started.

6 Claims, 9 Drawing Sheets

(51) Int. Cl.
| | |
|---|---|
| *B60W 10/06* | (2006.01) |
| *B60W 10/08* | (2006.01) |
| *B60W 10/26* | (2006.01) |
| *B60W 30/18* | (2012.01) |
| *B60K 6/48* | (2007.10) |
| *B60L 7/18* | (2006.01) |
| *B60L 7/26* | (2006.01) |
| *B60L 11/18* | (2006.01) |
| *F02D 29/02* | (2006.01) |

(52) U.S. Cl.
CPC ............ *B60L 11/1862* (2013.01); *B60W 10/06* (2013.01); *B60W 10/08* (2013.01); *B60W 10/18* (2013.01); *B60W 10/26* (2013.01); *B60W 20/00* (2013.01); *B60W 30/18127* (2013.01); *B60W 30/18136* (2013.01); *F02D 29/02* (2013.01); *B60L 2260/30* (2013.01); *B60W 2510/244* (2013.01); *B60W 2710/086* (2013.01); *Y02T 10/6221* (2013.01); *Y02T 10/6286* (2013.01); *Y02T 10/7005* (2013.01); *Y02T 10/705* (2013.01); *Y02T 10/7044* (2013.01); *Y10S 903/93* (2013.01); *Y10S 903/947* (2013.01)

(56) References Cited

U.S. PATENT DOCUMENTS

| | | |
|---|---|---|
| 2005/0119806 A1 | 6/2005 | Nasr et al. |
| 2008/0183348 A1 | 7/2008 | Arita et al. |

FOREIGN PATENT DOCUMENTS

| | | |
|---|---|---|
| JP | 2009-166611 A | 7/2009 |
| KR | 100450551 B1 | 9/2004 |

OTHER PUBLICATIONS

Office Action of the corresponding CN 201180040638.2 application; dated Dec. 26, 2014, which is enclosed with an English Translation.

REGENERATIVE CONTROL DEVICE, HYBRID VEHICLE, REGENERATIVE CONTROL METHOD, AND COMPUTER PROGRAM

CROSS REFERENCE TO RELATED APPLICATIONS

This is a U.S. national stage of application No. PCT/JP2011/074192, filed on Oct. 20, 2011. Priority under 35 U.S.C. §119(a) and 35 U.S.C. §365(b) is claimed from Japanese Patent Application No. 2010-271864, filed on Dec. 6, 2010, the disclosure of which are also incorporated herein by reference.

TECHNICAL FIELD

The present invention relates to a regeneration control device, a hybrid vehicle, a regeneration control method, and a computer program.

BACKGROUND ART

A hybrid vehicle includes an engine and an electric motor and is capable of running by the engine or the electric motor, or is capable of running by the cooperation between the engine and the electric motor. The electric power can be regenerated by the electric motor during the deceleration of the hybrid vehicle. When the regenerative power generation is performed, regeneration torque is generated at the electric motor. The regeneration torque works as friction during the running of the hybrid vehicle, and works as breaking force similarly to engine braking (for example, see patent literature PTL1). Note that the regeneration torque of the electric motor is proportional to the electric power regenerated by the electric motor. In other words, the larger the electric power regenerated by the electric motor is, the larger the regeneration torque of the electric motor is.

CITATION LIST

Patent Literature

PTL1:JP 2007-223421 A

SUMMARY OF INVENTION

Technical Problem

As described above, the regeneration torque of the electric motor of the hybrid vehicle works as the braking force similarly to engine braking. On the other hand, the upper limit of the electric power regeneration of the electric motor is properly regulated according to the State of Charge (hereinafter, referred to as SOC) of the battery. For example, when the SOC is low, the upper limit of the electric power regeneration of the electric motor can be set high because a large electric power is required to charge the battery. As described above, when the upper limit of the electric power regeneration of the electric motor is high, the electric motor can generate large regeneration torque. On the other hand, when the SOC is high, it is necessary to set the upper limit of the electric power regeneration lower in comparison with the case where the SOC is low in order to prevent the battery from being excessively charged. In that case, the electric motor cannot generate large regeneration torque. Thus, while the regeneration torque of the electric motor is used as the braking force of a hybrid vehicle, the braking force sometimes becomes insufficient when the SOC of the battery is high in comparison with when the SOC is low. Thus, sometimes the braking force requested by the driver is not accomplished. Accordingly, the driver sometimes feels the lack of the braking force and the drivability is sometimes aggravated.

In light of the foregoing, an objective of the present invention is to provide a regeneration control device, a hybrid vehicle, a regeneration control method, and a computer program that can improve the drivability when the regeneration torque of the electric motor is used as the braking force.

Solution to Problem

An aspect of the present invention is directed to a regeneration control device. The regeneration control device of a hybrid vehicle that includes an engine, an electric motor, and a battery configured to supply electric power to the electric motor, that is capable of running by the engine or the electric motor or capable of running by cooperation between the engine and the electric motor, that is capable of performing regenerative power generation by the electric motor at least during deceleration, and that is capable of using regeneration torque generated by the regenerative power generation of the electric motor as braking force while running only by the electric motor, includes control means, wherein a first threshold, a second threshold, and a third threshold are provided to a value indicating a state of charge of the battery, the second threshold is a larger value than the first threshold, and the third threshold is a larger value than the second threshold; when the state of charge of the battery is less than the first threshold or when the state of charge of the battery is equal to or less than the first threshold, the vehicle uses the regeneration torque of the electric motor as the braking force in an operating form solely with the electric motor, and, when the state of charge of the battery is equal to or more than the first threshold or when the state of charge of the battery exceeds the first threshold, the vehicle uses both of engine braking of the engine and the regeneration torque of the electric motor as the braking force in an operating form with cooperation of the engine and the electric motor; when the state of charge of the battery is equal to or more than the second threshold or when the state of charge of the battery exceeds the second threshold in such a state that the vehicle uses the regeneration torque of the electric motor as the braking force in the operating form solely with the electric motor because the state of charge of the battery is less than the first threshold or the state of charge of the battery is equal to or less than the first threshold, the vehicle uses both of engine braking of the engine and the regeneration torque of the electric motor as the braking force in the operating form with cooperation of the engine and the electric motor; and, when the state of charge of the battery is equal to or more than the third threshold or when the state of charge of the battery exceeds the third threshold in such a state that the vehicle uses both of engine braking of the engine and the regeneration torque of the electric motor as the braking force in the operating form with cooperation of the engine and the electric motor because the state of charge of the battery is equal to or more than the first or the second threshold or the state of charge of the battery exceeds the first or the second threshold, limitation of electric power by the regenerative power generation is started.

Another aspect of the present invention is directed to a hybrid vehicle. The hybrid vehicle includes the regeneration control device according to the aspect of the present invention.

Still another aspect of the present invention is directed to a regeneration control method. The regeneration control method of a hybrid vehicle that includes an engine, an electric motor, and a battery configured to supply electric power to the electric motor, that is capable of running by the engine or the electric motor or capable of running by a cooperation between the engine and the electric motor, that is capable of performing regenerative power generation by the electric motor at least during deceleration, and that is capable of using regeneration torque generated by the regenerative power generation of the electric motor as braking force while running only by the electric motor, includes: a step in which a first threshold, a second threshold, and a third threshold are provided to a value indicating a state of charge of the battery, the second threshold is a larger value than the first threshold, and the third threshold is a larger value than the second threshold, and, when the state of charge of the battery is less than the first threshold or when the state of charge of the battery is equal to or less than the first threshold, the vehicle uses the regeneration torque of the electric motor as the braking force in an operating form solely with the electric motor, and, when the state of charge of the battery is equal to or more than the first threshold or when the state of charge of the battery exceeds the first threshold, the vehicle uses both of engine braking of the engine and the regeneration torque of the electric motor as the braking force in an operating form with cooperation of the engine and the electric motor; a step in which, when the state of charge of the battery is equal to or more than the second threshold or when the state of charge of the battery exceeds the second threshold in such a state that the vehicle uses the regeneration torque of the electric motor as the braking force in the operating form solely with the electric motor because the state of charge of the battery is less than the first threshold or the state of charge of the battery is equal to or less than the first threshold, the vehicle uses both of engine braking of the engine and the regeneration torque of the electric motor as the braking force in the operating form with cooperation of the engine and the electric motor; and a step in which, when the state of charge of the battery is equal to or more than the third threshold or when the state of charge of the battery exceeds the third threshold in such a state that the vehicle uses both of engine braking of the engine and the regeneration torque of the electric motor as the braking force in the operating form with cooperation of the engine and the electric motor because the state of charge of the battery is equal to or more than the first or the second threshold or the state of charge of the battery exceeds the first or the second threshold, limitation of electric power by the regenerative power generation is started.

The other aspect of the present invention is directed to a computer program. The computer program causes an information processing apparatus to implement a function of the regeneration control device according to the aspect of the present invention.

Advantageous Effects of Invention

The present invention can improve the drivability when the regeneration torque of the electric motor is used as the braking force.

DESCRIPTION OF EMBODIMENTS

Hereinafter, the hybrid vehicle according to an embodiment of the present invention will be described with reference to FIGS. 1 to 9.

Figure 1:
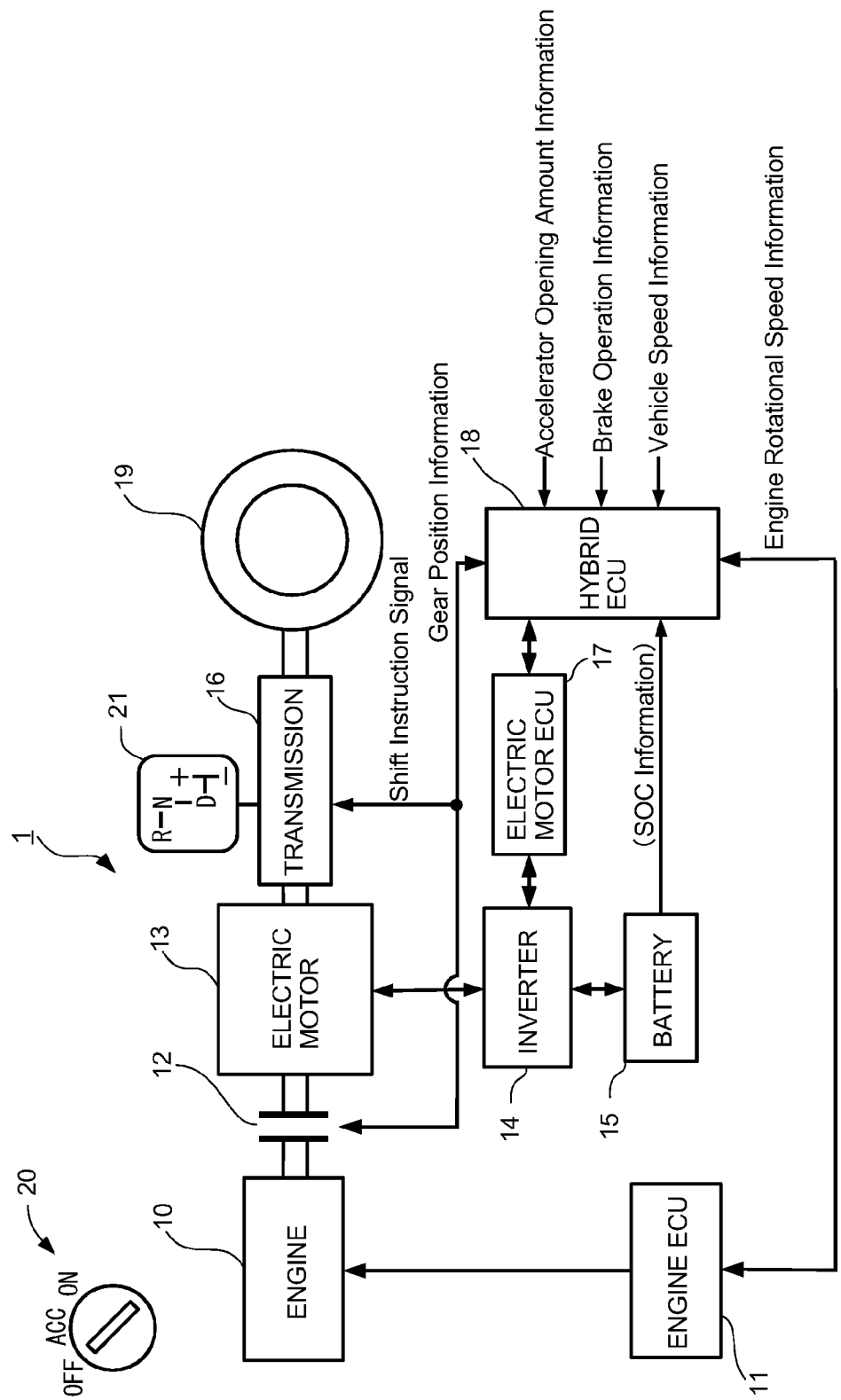
FIG. 1 is a block diagram for illustrating an exemplary structure of a hybrid vehicle according to an embodiment of the present invention.

FIG. 1 is a block diagram for illustrating an exemplary structure of a hybrid vehicle 1. The hybrid vehicle 1 is an example of a vehicle. The hybrid vehicle 1 is driven by an engine (internal combustion engine) 10 and/or an electric motor 13 through a gear box that is an automated mechanical/manual transmission. The regeneration torque of the electric motor 13 can generate braking force like the engine braking of the engine 10 at the deceleration of the vehicle. Note that the automated mechanical/manual transmission is a transmission that can automatically shift the gears while having the same structure as a manual transmission.

The hybrid vehicle 1 includes the engine 10, an engine Electronic Control Unit (ECU) 11, a clutch 12, the electric motor 13, an inverter 14, a battery 15, a transmission 16, an electric motor ECU 17, a hybrid ECU 18, a wheel 19, a key switch 20, and a shift unit 21. Note that the transmission 16 includes the above-mentioned automated mechanical/manual transmission, and is operated by the shift unit 21 including a drive range (hereinafter, referred to as a D (Drive) range). When the shift unit 21 is at the D range, the gear shifting operation of the automated mechanical/manual transmission is automated.

The engine 10 is an example of an internal combustion engine, and is controlled by the engine ECU 11. The engine 10 internally combusts gasoline, light oil, Compressed Natural Gas (CNG), Liquefied Petroleum Gas (LPG), alternative fuel, or the like in order to generate power for rotating a shaft and transmit the generated power to the clutch 12.

The engine ECU 11 is a computer working in coordination with the electric motor ECU 17 according to the instructions from the hybrid ECU 18, and controls the engine 10, for example, the amount of fuel injection and the valve timing. For example, the engine ECU 11 includes a Central Processing Unit (CPU), an Application Specific Integrated Circuit (ASIC), a microprocessor (microcomputer), a Digital Signal Processor (DSP), and the like, and internally has an operation unit, a memory, an Input/Output (I/O) port, and the like.

The clutch 12 is controlled by the hybrid ECU 18, and transmits the shaft output from the engine 10 to the wheel 19 through the electric motor 13 and the transmission 16. In other words, the clutch 12 mechanically connects the rotating shaft of the engine 10 to the rotating shaft of the electric motor 13 by the control of the hybrid ECU 18 in order to transmit the shaft output of the engine 10 to the electric motor 13. On the other hand, the clutch 12 cuts the mechanical connection between the rotating shaft of the engine 10 and the rotating shaft of the electric motor 13 so that the shaft of the engine 10 and the rotating shaft of the electric motor 13 can rotate at different rotational speeds from each other.

For example, the clutch 12 mechanically connects the rotating shaft of the engine 10 to the rotating shaft of the electric motor 13, for example, when the hybrid vehicle 1 runs by the power of the engine 10 and this causes the electric motor 13 to generate electric power, when the driving force of the electric motor 13 assists the engine 10, and when the electric motor 13 starts the engine 10.

Further, for example, the clutch 12 cuts the mechanical connection between the rotating shaft of the engine 10 and the rotating shaft of the electric motor 13 when the engine 10 stops or is in an idling state and the hybrid vehicle 1 runs by the driving force of the electric motor 13, and when the hybrid vehicle 1 reduces the speed or runs on the downgrade and the electric motor 13 generates electric power (regenerates electric power) while the engine 10 stops or is in an idling state.

Note that the clutch 12 differs from the clutch operated by the driver's operation of a clutch pedal, and is operated by the control of the hybrid ECU 18.

The electric motor 13 is a so-called motor generator that supplies a shaft output to the transmission 16 by generating the power for rotating the shaft using the electric power supplied from the inverter 14, or that supplies electric power to the inverter 14 by generating the electric power using the power for rotating the shaft supplied from the transmission 16. For example, when the hybrid vehicle 1 gains the speed or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or the hybrid vehicle 1 reduces the speed or runs on the downgrade. In that case, electric power is generated by the power for rotating the shaft supplied from the transmission 16 and is supplied to the inverter 14 in order to charge the battery 15. As described above, a state in which the electric motor 13 generates electric power is a state in which the hybrid vehicle 1 performs a "regeneration to the battery 15". Accordingly, the electric motor 13 generates the amount of regeneration torque according to the regenerated electric power.

The inverter 14 is controlled by the electric motor ECU 17, and converts the direct voltage from the battery 15 into an alternating voltage or converts the alternating voltage from the electric motor 13 into a direct voltage. When the electric motor 13 generates power, the inverter 14 converts the direct voltage from the battery 15 into an alternating voltage and supplies the electric power to the electric motor 13. When the electric motor 13 generates electric power, the inverter 14 converts the alternating voltage from the electric motor 13 into a direct voltage. In other words, in that case, the inverter 14 works as a rectifier and a voltage regulator for supplying a direct voltage to the battery 15.

The battery 15 is a secondary cell capable of being charged and discharged. The battery 15 supplies electric power to the electric motor 13 through the inverter 14 when the electric motor 13 generates power. Alternatively, the battery 15 is charged with the electric power generated by the electric motor 13 when the electric motor 13 generates electric power. A proper range of the SOC is determined for the battery 15 and the battery 15 is controlled to maintain the SOC within the range.

The transmission 16 includes an automated mechanical/manual transmission (not shown in the drawings) that selects one of a plurality of gear ratios (change gear ratios) according to the shift instruction signal from the hybrid ECU 18 in order to shift the change gear ratios and transmit the gear-shifted power of the engine 10 and/or of the electric motor 13 to the wheel 19. Alternatively, the transmission 16 transmits the power from the wheel 19 to the electric motor 13, for example, when the vehicle reduces the speed or runs on the downgrade. Note that the automated mechanical/manual transmission can also shift the gear position to a given gear number by the driver's hand operation of the shift unit 21.

The electric motor ECU 17 is a computer working in coordination with the engine ECU 11 according to the instructions from the hybrid ECU 18, and controls the electric motor 13 by controlling the inverter 14. For example, the electric motor ECU 17 includes a CPU, an ASIC, a microprocessor (microcomputer), a DSP, and the like, and internally has an operation unit, a memory, an I/O port, and the like.

The hybrid ECU 18 is an example of a computer. For hybrid driving, the hybrid ECU 18 obtains accelerator opening amount information, brake operation information, vehicle speed information, the gear position information obtained from the transmission 16, and the engine rotational speed information obtained from the engine ECU 11 in order to refer to the information, controls the clutch 12 and supplies the shift instruction signal in order to control the transmission 16. For hybrid driving, the hybrid ECU 18 further gives the instructions to the motor ECU 17 to control the electric motor 13 and the inverter 14 based on the obtained SOC information on the battery 15 and other information, and gives the instruction to the engine ECU 11 to control the engine 10. These instructions include an instruction to control the regeneration control described below. For example, the hybrid ECU 18 includes a CPU, an ASIC, a microprocessor (microcomputer), a DSP, and the like, and internally has an operation unit, a memory, an I/O port, and the like.

Note that a computer program to be executed by the hybrid ECU 18 can be installed on the hybrid ECU 18 that is a computer in advance by being stored in a non-volatile memory inside the hybrid ECU 18 in advance.

The engine ECU 11, the electric motor ECU 17, and the hybrid ECU 18 are connected to each other, for example, through a bus complying with the standard of the Control Area Network (CAN) or the like.

The wheel 19 is a drive wheel for transmitting the driving force to the road surface. Note that, although only a wheel 19 is illustrated in FIG. 1, the hybrid vehicle 1 actually includes a plurality of the wheels 19.

The key switch 20 is a switch that is turned ON/OFF, for example, by insertion of a key by the user at the start of drive. Turning ON the switch activates each unit of the hybrid vehicle 1, and turning OFF the key switch 20 stops each unit of the hybrid vehicle 1.

As described above, the shift unit 21 is for giving the instruction from the driver to the automated mechanical/manual transmission of the transmission 16. When the shift unit 21 is at the D range, the gear shifting operation of the automated mechanical/manual transmission is automated.

Figure 2:
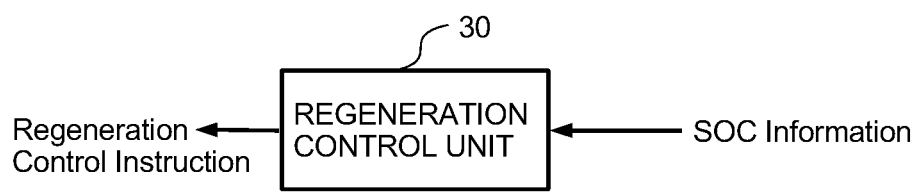
FIG. 2 is a block diagram for illustrating an exemplary configuration of a function implemented in a hybrid ECU illustrated in FIG. 1.

FIG. 2 is a block diagram for illustrating an exemplary configuration of a function implemented in the hybrid ECU 18 executing a computer program. In other words, when the hybrid ECU 18 executes a computer program, the function of the regeneration control unit 30 is implemented.

The regeneration control unit 30 is a function for giving the instruction about a regeneration control (in the drawing, referred to as regeneration control instruction) to the engine ECU 11, the clutch 12, the inverter 14, and the electric motor ECU 17 based on the SOC information of the battery 15.

Figure 3:
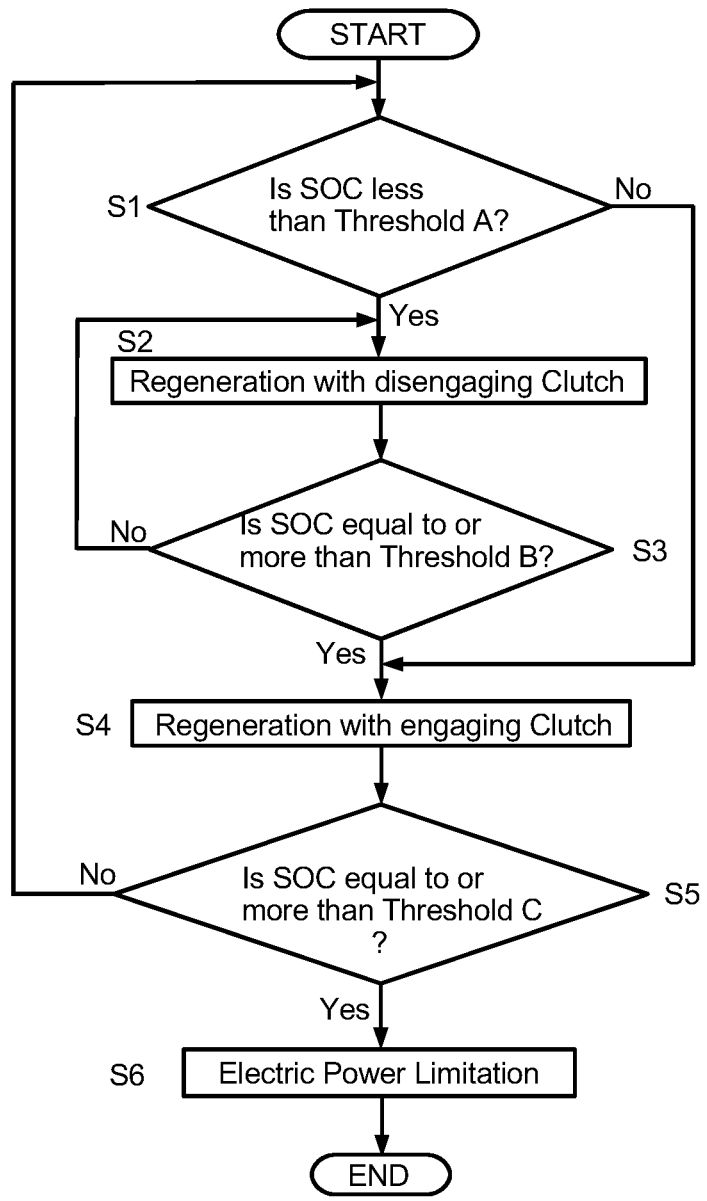
FIG. 3 is a flowchart for illustrating a process of a regeneration control unit illustrated in FIG. 2.

Next, the process for the regeneration control performed in the hybrid ECU 18 executing the computer program will be described with reference to the flowchart illustrated in FIG. 3. Note that the flow from step S1 to step S6 in FIG. 3 is one cycle of the process, and is repeatedly performed as long as the key switch 20 is the ON state. Note that the procedures are briefly described here and the meanings will be described below with reference to FIGS. 4, 5, and 6.

In the "START" illustrated in FIG. 3, the key switch 20 is the ON state, the hybrid ECU 18 has executed a computer program, and a function of the regeneration control unit 30 is implemented by the hybrid ECU 18. Then, the process goes to step S1.

In step S1, the regeneration control unit 30 determines whether the value of the SOC of the battery 15 is less than a threshold A. When it is determined in step S1 that the value is less than the threshold A, the process goes to step S2. On the other hand, when it is determined in step S1 that the value is equal to or more than the threshold A, the process goes to step S4.

In step 2, the regeneration control unit 30 disengages the clutch 12 and performs regeneration. Then, the process goes to step S3.

In step S3, the regeneration control unit 30 determines whether the value of the SOC of the battery 15 is equal to or more than a threshold B. When it is determined in step S3 that the value is equal to or more than the threshold B, the process goes to step S4. On the other hand, when it is determined in step S3 that the value is less than the threshold B, the process goes back to step S2.

In step 4, the regeneration control unit 30 engages the clutch 12 and performs regeneration. Then, the process goes to step S5.

In step S5, the regeneration control unit 30 determines whether the value of the SOC of the battery 15 is equal to or more than a threshold C. When it is determined in step S5 that the value is equal to or more than the threshold C, the process goes to step S6. On the other hand, when it is determined in step S5 that the value is less than the threshold C, the process goes back to step S1.

In step 6, the regeneration control unit 30 limits the electric power by the regeneration of the electric motor 13 and terminates one cycle of the process (END).

Figure 4:
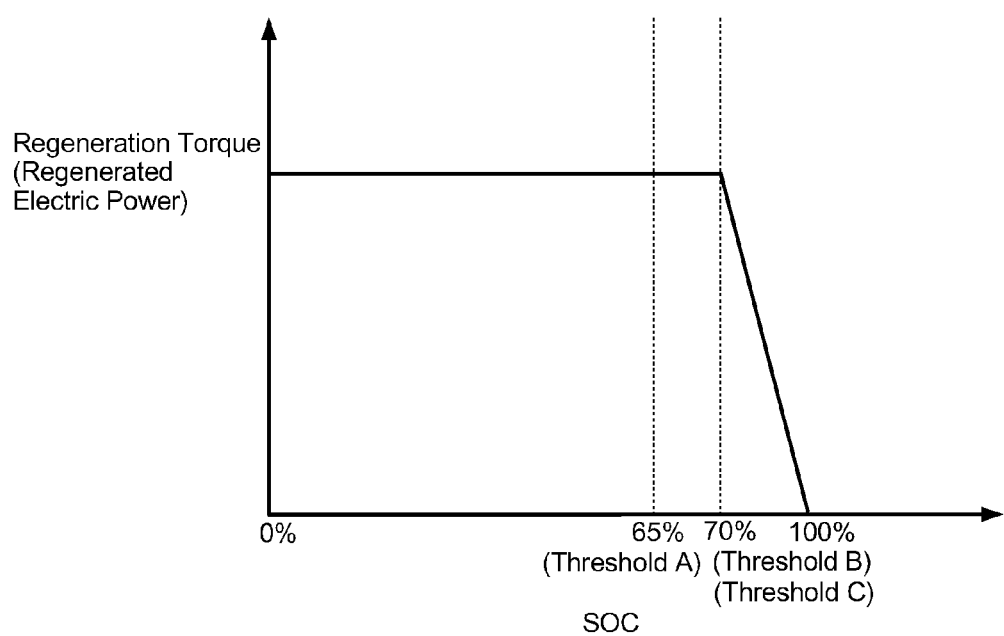
FIG. 4 is a view for illustrating, with thresholds A, B, and C, the relationship between regeneration torque (regenerated electric power) and the SOC.
Figure 5:
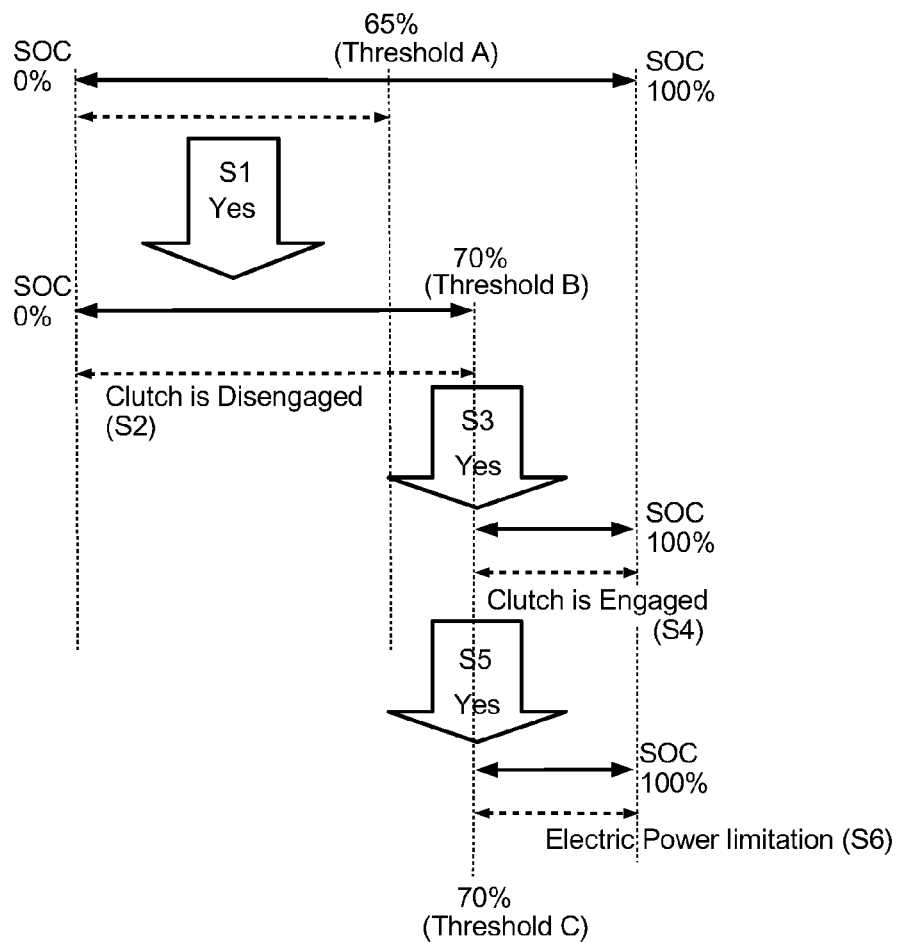
FIG. 5 is a view for illustrating the flow of the process in the case of Yes in step S1 in the process illustrated in FIG. 3.
Figure 6:
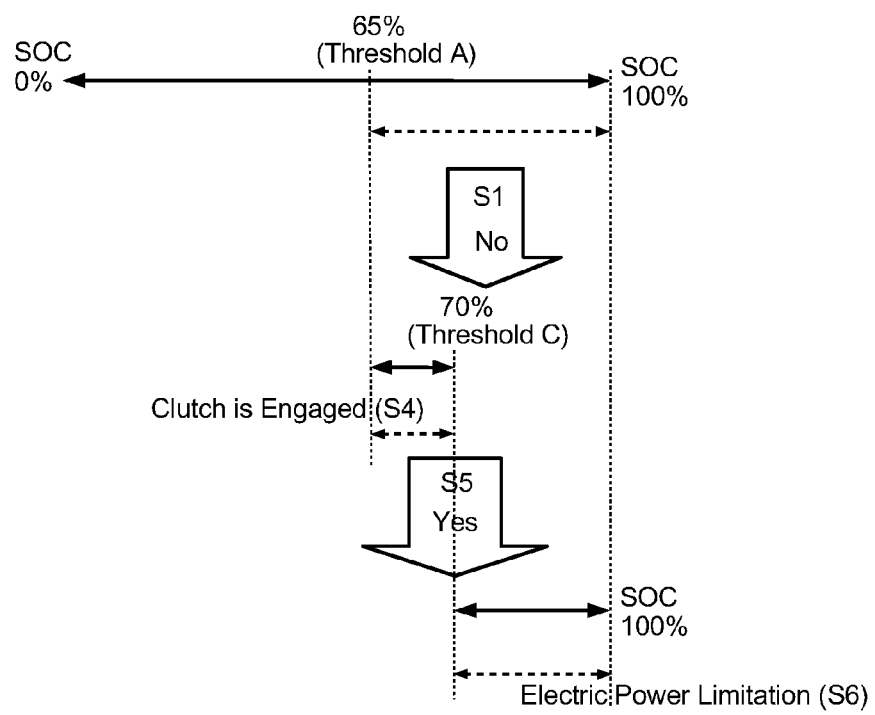
FIG. 6 is a view for illustrating the flow of the process in the case of No in step S1 in the process illustrated in FIG. 3.

Next, the process of the regeneration control unit 30 described in the flowchart in FIG. 3 will be concretely described with reference to FIGS. 4, 5, and 6. FIG. 4 is a view for illustrating, with the threshold A (a first threshold in claims), the threshold B (a second threshold in claims), and the threshold C (a third threshold in claims), the relationship between regeneration torque (regenerated electric power) and the SOC. The time is shown on the horizontal axis, and the regeneration torque (regenerated electric power) is shown on the vertical axis. FIG. 5 is a view for illustrating the flow of the process in the case of Yes in step S1 in the process illustrated in FIG. 3. FIG. 6 is a view for illustrating the flow of the process in the case of No in step S1 in the process illustrated in FIG. 3. Note that, for simplifying the description, the threshold A is set at 65% of the value of the SOC, the threshold B is set at 70% of the value of the SOC, and the threshold C is set at 70% of the value of the SOC. However, the thresholds A, B, and C are not limited to these values, and can variously be set as long as the relationship of the threshold A<the threshold B≤the threshold C is satisfied.

When the flow in FIG. 3 is started (START), the regeneration control unit 30 first determines whether the value of the SOC is less than the threshold A (step S1). At that time, for example, when the SOC is less than 65% as illustrated in FIG. 5 (Yes in step S1), the battery 15 needs to be charged and thus it is not necessary to limit the electric power regeneration. The electric power regeneration of the electric motor 13 is increased so that large regeneration torque can be generated. Accordingly, the clutch 12 is disengaged and the regeneration is performed (step S2). After that, the determination is done according to the threshold B (step S3). When the SOC is equal to or more than 70% (threshold B) (Yes in step S3), charging the battery 15 is soon completed. The regeneration control unit 30 performs regeneration with engaging the clutch (step S4) because it might be necessary to reduce the electric power regeneration by the electric motor 13 in order to reduce the regeneration torque. Because here is set the threshold B=the threshold C, the regeneration control unit 30 simultaneously performs the regeneration with engaging the clutch in step S4 and the electric power limitation (Yes in step S5, and step S6).

Further, for example, when the SOC is equal to or more than 65% (threshold A) (No in step S1) as illustrated in FIG. 6, the regeneration control unit 30 performs regeneration with engaging the clutch (step S4) because it might be necessary to reduce the electric power regeneration by the electric motor 13 in order to reduce the regeneration torque soon. In the example of FIG. 6, the regeneration with engaging the clutch is performed without the electric power limitation while the SOC is equal to or more than 65% (threshold A) and less than 70% (threshold C). When the SOC is more than 70% (threshold C) (Yes in step S5), the regeneration control unit 30 performs the regeneration with engaging the clutch while limiting the electric power (step S6).

Advantageous Effect

Figure 7:
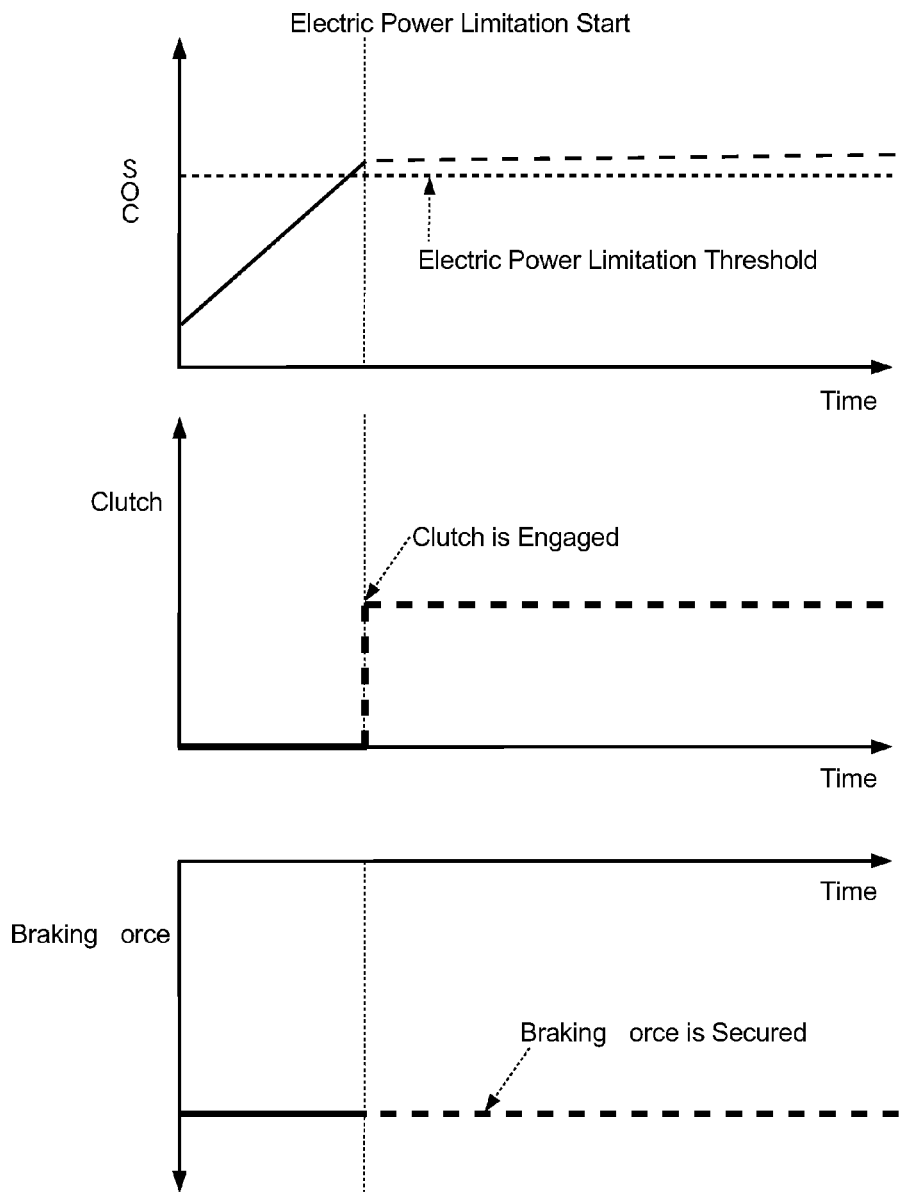
FIG. 7 is a view for illustrating, with the time course, the relationship among the SOC, the disengaged or engaged state of the clutch, and the deceleration in a regeneration control of the regeneration control unit illustrated in FIG. 2.
Figure 8:
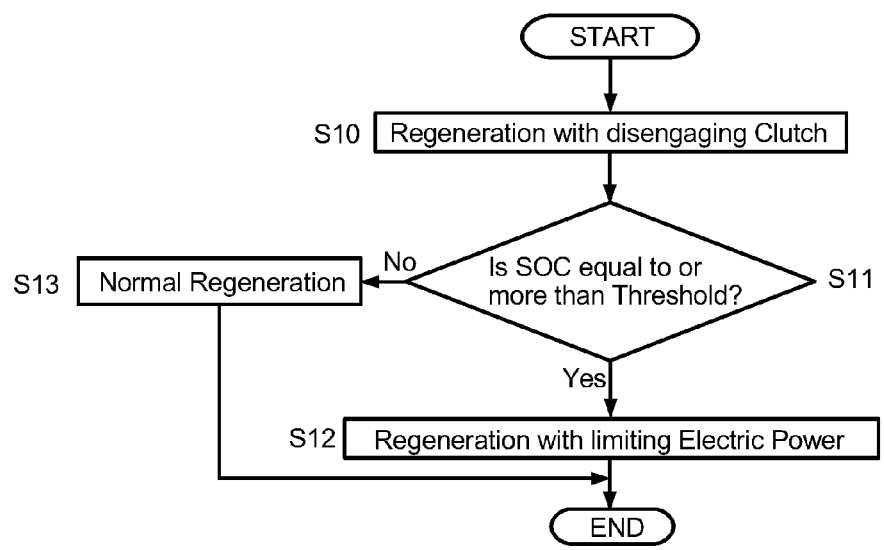
FIG. 8 is a flowchart for illustrating a process of a regeneration control as a comparison example.
Figure 9:
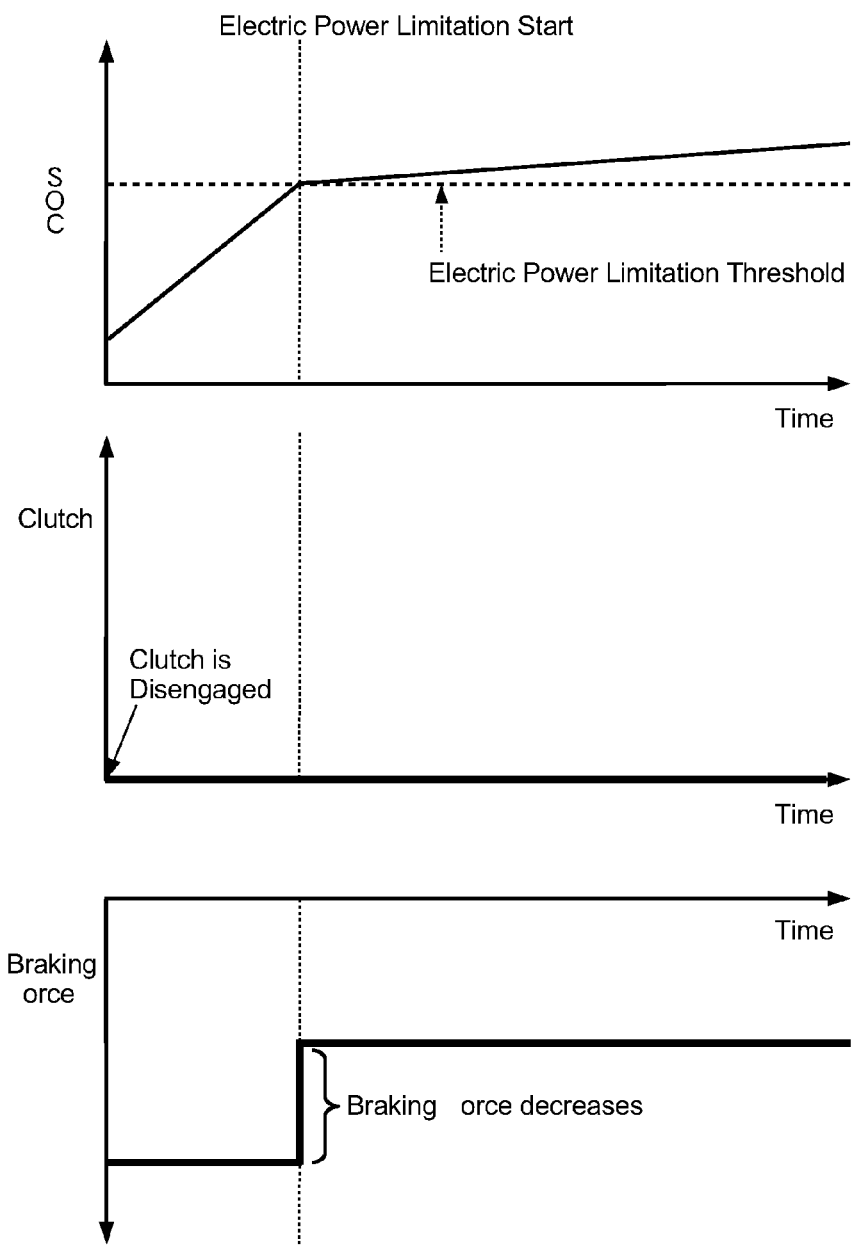
FIG. 9 is a view for illustrating, with the time course, the relationship among the SOC, the disengaged or engaged state of the clutch, and the deceleration in the regeneration control of the comparison example.

The effect of the present embodiment will be described below with reference to FIGS. 7 to 9. FIG. 7 is a view for illustrating, with the time course, the relationship among the SOC (the top of the drawing), the disengaged or engaged state of the clutch (the center of the drawing), and the deceleration (the bottom of the drawing) in a regeneration control of the regeneration control unit 30. Note that, in FIG. 7, the state before the beginning of the electric power limitation is shown with a solid line and the state after the beginning of the electric power limitation is shown with a dashed line. FIG. 8 is a flowchart for illustrating a process of a regeneration control as a comparison example. FIG. 9 is a view for illustrating, with the time course, the relationship among the SOC (the top of the drawing), the disengaged or engaged state of the clutch (the center of the drawing), and the deceleration (the bottom of the drawing) in the process of the regeneration control of the comparison example.

As illustrated at the top of FIG. 7, when the SOC reaches an electric power limitation threshold (corresponding to the threshold C) or more, the regeneration control unit 30 limits the electric power by the regeneration of the electric motor 13 and thus the increase in the SOC almost stops. At that time, as illustrated at the center of FIG. 7, the regeneration control unit 30 engages the clutch 12 with limiting the electric power by the regeneration of the electric motor 13. This causes the braking force by the regeneration torque of the electric motor 13 to work together with the braking force by the engine braking of the engine 10 as illustrated at the bottom of FIG. 7 and thus can secure necessary braking force.

Here, a comparison example will be described with reference to FIGS. 8 and 9. FIG. 8 is a flowchart for illustrating a process of a regeneration control as a comparison example. FIG. 9 is a view for illustrating, with the time course, the relationship among the SOC, the disengaged or engaged state of the clutch, and the deceleration in the regeneration control of the comparison example.

As described in FIG. 8, in the regeneration control in the comparison example, once it has been determined that the regeneration is performed with disengaging the clutch 12 (step S10), merely the regeneration with limiting the electric power by the regeneration of the electric motor 13 is performed (step S12) when the SOC is equal to or more than a threshold (Yes in step S11), and a normal regeneration is performed (step S13) when the SOC is less than the threshold (No in step S11).

As a result of it, the SOC continues to further increase although slowly after exceeding the electric power limitation threshold as illustrated at the top of FIG. 9. It is because the regeneration torque is generated in order to generate braking force although slightly even while the electric power is limited. Such a control is not preferable because possibly causing the overcharge of the battery 15. Further, at that time, the clutch remains disengaged as illustrated at the center of FIG. 9. Thus, the braking force depending only on the regeneration torque of the electric motor 13 is driven to decrease as illustrated at the bottom of FIG. 9.

As seen in the comparison of FIG. 7 and FIG. 9, the present embodiment can secure necessary braking force while performing regeneration with limiting the electric power by the regeneration of the electric motor 13. This can improve the drivability when the regeneration torque of the electric motor 13 is used as the braking force. Further, when the SOC exceeds the electric power limitation threshold, the electric power regeneration can almost be eliminated and thus the overcharge of the battery 15 can be eliminated.

Note that A<B=C has been described as an example of the thresholds A, B, and C in the above-mentioned embodiment. According to the example, after the regeneration mode (in other words, whether the regeneration with disengaging the clutch or the regeneration with engaging the clutch) has been determined, it is determined according to the threshold A whether to disengage or to engage the clutch. For example, the regeneration with disengaging the clutch is performed when the SOC is less than the threshold A and the regeneration switches to the regeneration with engaging the clutch when the SOC exceeds the threshold B. At that time, setting the thresholds at the threshold A<the threshold B can prevent the regeneration with disengaging the clutch from switching to the regeneration with engaging the clutch in a short time. In other words, the switch to the regeneration with engaging the clutch during the regeneration with disengaging the clutch sometimes shocks the hybrid vehicle 1 because of the deceleration and thus affects the drivability. Accordingly, it is preferable to set a certain amount of margin as the threshold B. As described above, the thresholds are set at the threshold A<the threshold B in order to continue the regeneration with disengaging the clutch to some degree even though the SOC exceeds the threshold A that is a criterion for determining whether to disengage or to engage the clutch. Further, when the SOC finally exceeds the threshold B, the regeneration switches to the regeneration with engaging the clutch in order to prioritize the protection of the battery 15 over the drivability. Simultaneously, the regeneration is reduced in order to satisfy the threshold C. At that time, even though the regeneration is reduced, the decelerating force is maintained because of the regeneration with engaging the clutch.

Other Embodiments

The values of the boundaries for determination can variously be changed, for example, the "equal to or more than" can be changed into "exceeds" and the "equal to or less than" can be changed into "less than" in the description of the flowchart illustrated in FIG. 3.

Further, although the thresholds are set at the threshold A<the threshold B=the threshold C in the above-mentioned description, the thresholds may be set at the threshold A<the threshold B≤the threshold C, and the values of the thresholds A, B, and C can be variously changed. For example, the threshold A can be set at 60%, the threshold B can be set at 65%, and the threshold C can be set at 70%. In that case, the SOC when the regeneration with disengaging the clutch switches to the regeneration with engaging the clutch becomes lower than the SOC of the above-mentioned embodiment. When the battery 15 is a type of battery that rarely has a problem even though the SOC is high, for example, the threshold A can be set at 65%, the threshold B can be set at 70%, and the threshold C can be set at 80%.

Although the engine 10 has been described as an internal combustion engine, the engine 10 can also be a heat engine including an external combustion engine.

Further, while the computer program executed by the hybrid ECU 18 is installed on the hybrid ECU 18 in advance in the above-mentioned description, the computer program can be installed on the hybrid ECU 18 as a computer by attaching removable media recording the computer program (storing the computer program), for example, to a drive (not shown in the drawings) and storing the computer program read from the removable media in a non-volatile memory inside the hybrid ECU 18, or receiving, by a communication unit (not shown in the drawings), a computer program transmitted through a wired or wireless transmission medium and storing the computer program in a non-volatile memory inside the hybrid ECU 18.

Further, each ECU can be implemented by an ECU combining each of the ECUs. Alternatively, an ECU can newly be provided by the further subdivision of the function of each ECU.

Note that the computer program executed by the computer can be for performing the process in chronological order according to the order described herein or can be for performing the process in parallel or at the necessary timing, for example, when the computer program is invoked.

Further, the embodiments of the present invention are not limited to the above-mentioned embodiments, and can be variously modified without departing from the gist of the invention.

The invention claimed is:

1. A regeneration control device of a hybrid vehicle that includes an engine, an electric motor, and a battery configured to supply electric power to the electric motor, that is capable of running by the engine or the electric motor or capable of running by cooperation between the engine and the electric motor, that is capable of performing regenerative power generation by the electric motor at least during deceleration, and that is capable of using regeneration torque generated by the regenerative power generation of the electric motor as braking force while running only by the electric motor, comprising:

a control unit for comparing a value indicating a state of charge of the battery with a first threshold, a second threshold, and a third threshold, wherein the second threshold is a larger value than the first threshold, and the third threshold is a larger or equal value than the second threshold, and the control unit for,
- either, when the state of charge of the battery is less than the first threshold, braking the vehicle using only the regeneration torque of the electric motor as the braking force in an operating form solely with the electric motor, when the state of charge of the battery is equal to or more than the first threshold or exceeds the first threshold, braking the vehicle using both of engine braking of the engine and the regeneration torque of the electric motor as the braking force in an operating form with cooperation of the engine and the electric motor, except that when braking is carried out by only the regeneration torque of the electric motor, continuing the braking by the regeneration torque of the electric motor until the state of charge of the battery is equal to or more than the second threshold or exceeds the second threshold, when the state of charge of the battery is equal to or more than the second threshold or exceeds the second threshold, braking the vehicle using both of engine braking of the engine and the regeneration torque of the electric motor as the braking force in the operating form with cooperation of the engine and the electric motor, and when the state of charge of the battery is equal to or more than the third threshold or exceeds the third threshold in such a state that braking is carried out by both of engine braking of the engine and the regeneration torque of the electric motor as the braking force in the operating form with cooperation of the engine and the electric motor, starting limitation of electric power by the regenerative power generation,
- or, when the state of charge of the battery is equal to or less than the first threshold, braking the vehicle using only the regeneration torque of the electric motor as the braking force in an operating form solely with the electric motor, when the state of charge of the battery is equal to or more than the first threshold or exceeds the first threshold, braking the vehicle using both of engine braking of the engine and the regeneration torque of the electric motor as the braking force in an operating form with cooperation of the engine and the electric motor, except that when braking is carried out by only the regeneration torque of the electric motor, continuing the braking by the regeneration torque of the electric motor until the state of charge of the battery is equal to or more than the second threshold or exceeds the second threshold, when the state of charge of the battery is equal to or more than the second threshold or exceeds the second threshold, braking the vehicle using both of engine braking of the engine and the regeneration torque of the electric motor as the braking force in the operating form with cooperation of the engine and the electric motor, and when the state of charge of the battery is equal to or more than the third threshold or exceeds the third threshold in such a state that braking is carried out by both of engine braking of the engine and the regeneration torque of the electric motor as the braking force in the operating form with cooperation of the engine and the electric motor, starting limitation of electric power by the regenerative power generation.

2. The regeneration control device according to claim 1, wherein when the second threshold is equal to the third threshold, the regeneration control unit simultaneously performs the regenerative power generation with engaging a clutch and the electric power limitation.

3. A hybrid vehicle comprising the regeneration control device according to claim 1.

4. A non-transitory computer readable medium for storing a computer program for causing an information processing apparatus to implement a function of the regeneration control device according to claim 1.

5. A regeneration control method of a hybrid vehicle that includes an engine, an electric motor, and a battery configured to supply electric power to the electric motor, that is capable of running by the engine or the electric motor or capable of running by a cooperation between the engine and the electric motor, that is capable of performing regenerative power generation by the electric motor at least during deceleration, and that is capable of using regeneration torque generated by the regenerative power generation of the electric motor as braking force while running only by the electric motor, the regeneration control method comprising:
- a step in which a control unit compares a value indicating a state of charge of the battery with a first threshold, a second threshold, and a third threshold, wherein the second threshold is a larger value than the first threshold, and the third threshold is a larger or equal value than the second threshold, and either,
- a step in which, when the state of charge of the battery is less than the first threshold, braking the vehicle using only the regeneration torque of the electric motor as the braking force in an operating form solely with the electric motor, when the state of charge of the battery is equal to or more than the first threshold or exceeds the first threshold, braking the vehicle using both of engine braking of the engine and the regeneration torque of the electric motor as the braking force in an operating form with cooperation of the engine and the electric motor, except that when braking is carried out by only the regeneration torque of the electric motor, continuing the braking by the regeneration torque of the electric motor until the state of charge of the battery is equal to or more than the second threshold or exceeds the second threshold;
- a step in which, when the state of charge of the battery is equal to or more than the second threshold or exceeds the second threshold, braking the vehicle using both of engine braking of the engine and the regeneration torque of the electric motor as the braking force in the operating form with cooperation of the engine and the electric motor; and
- a step in which, when the state of charge of the battery is equal to or more than the third threshold or exceeds the third threshold in such a state that the braking is carried out by both of engine braking of the engine and the regeneration torque of the electric motor as the braking force in the operating form with cooperation of the engine and the electric motor, starting limitation of electric power by the regenerative power generation, or,
- a step in which, when the state of charge of the battery is equal to or less than the first threshold, braking the vehicle using only the regeneration torque of the electric motor as the braking force in an operating form solely with the electric motor, when the state of charge of the battery is equal to or more than the first threshold or exceeds the first threshold, braking the vehicle using both of engine braking of the engine and the regeneration torque of the electric motor as the braking force in an operating form with cooperation of the engine and the electric motor, except that when braking is carried out by only the regeneration torque of the electric motor, continuing the braking by the regeneration torque of the electric motor until the state of charge of the battery is equal to or more than the second threshold or exceeds the second threshold, a step in which, when the state of charge of the battery is equal to or more than the second threshold or exceeds the second threshold, braking the vehicle using both of engine braking of the engine and the regeneration torque of the electric motor as the braking force in the operating form with cooperation of the engine and the electric motor, and a step in which, when the state of charge of the battery is equal to or more than the third threshold or exceeds the third threshold in such a state that braking is carried out by both of engine braking of the engine and the regeneration torque of the electric motor as the braking force in the operating form with cooperation of the engine and the electric motor, starting limitation of electric power by the regenerative power generation.

6. The regeneration control method according to claim 5, wherein when the second threshold is equal to the third threshold, the regeneration control unit simultaneously performs the regenerative power generation with engaging a clutch and the electric power limitation.

* * * * *